United States Patent [19]
Ohashi et al.

[11] Patent Number: 5,514,347
[45] Date of Patent: May 7, 1996

[54] HONEYCOMB STRUCTURE AND A METHOD OF MAKING SAME

[75] Inventors: Tsuneaki Ohashi, Ohgaki; Nobuo Tsuno, Kasugai, both of Japan

[73] Assignee: NGK Insulators, Ltd., Nagoya, Japan

[21] Appl. No.: 201,477

[22] Filed: Feb. 24, 1994

[30] Foreign Application Priority Data

Mar. 1, 1993 [JP] Japan ................................. 5-039865

[51] Int. Cl.$^6$ .............................. B01D 53/94; B01J 8/02; B22F 7/00
[52] U.S. Cl. ................................. 422/174; 29/890; 419/5; 422/180; 422/181; 422/218; 422/222; 428/117; 428/593
[58] Field of Search ............................ 422/174, 177, 422/180, 181, 199, 211, 218, 222; 502/439, 527; 60/299, 300; 219/552, 553; 29/890; 419/5, 6, 10; 75/228, 230; 428/593, 117

[56] References Cited

U.S. PATENT DOCUMENTS

| | | | |
|---|---|---|---|
| 3,881,701 | 5/1975 | Schoenman et al. | 422/224 X |
| 4,576,800 | 3/1986 | Retallick | 422/180 |
| 4,647,435 | 3/1987 | Nonnemann | 422/180 |
| 4,882,130 | 11/1989 | Asai et al. | 422/180 X |
| 4,987,034 | 1/1991 | Hitachi et al. | 422/180 X |
| 5,063,029 | 11/1991 | Mizuno et al. | 422/175 |
| 5,118,475 | 6/1992 | Cornelison | 422/174 |
| 5,312,694 | 5/1994 | Sugawara | 422/180 X |
| 5,317,869 | 6/1994 | Takeuchi | 60/300 |

FOREIGN PATENT DOCUMENTS

| | | |
|---|---|---|
| 3-118838 | 5/1991 | Japan . |
| 4-203416 | 7/1992 | Japan . |

*Primary Examiner*—Robert J. Warden
*Assistant Examiner*—Robert Carpenter
*Attorney, Agent, or Firm*—Ronald J. Kubovcik

[57] ABSTRACT

A honeycomb structure having a periphery and two ends, including a plurality of passages which are defined by partition walls and extend in an axial direction between the ends, wherein the partition walls are formed of a plurality of through holes for forming turbulent flow so that the fluid pass through the through holes from one of the passages to the adjacent passage, each of the through holes having an open area of at least 0.25 mm$^2$, thereby a stream of the fluid passing through the honeycomb structure is efficiently mixed to increase its contact with a catalyst composition coated on a surface of the partition walls. The honeycomb structure may have a corrugated thin metal foil. Alternatively, the honeycomb structure may have a unitary structure formed by sintering an extruded body comprising a powder material. A heater for heating fluid flowing therethrough, has the honeycomb structure being electrically conductive and an electrode for applying electric current to the honeycomb structure so as to generate heat.

18 Claims, 7 Drawing Sheets

HONEYCOMB STRUCTURE AND A METHOD OF MAKING SAME

BACKGROUND OF THE INVENTION

1. Field of the Invention

The present invention relates to a honeycomb structure, which can be used as a preheater, a particulate trap, or a catalytic converter for controlling automobile exhaust emission. The preheater may be an element in a catalytic converter for controlling automobile exhausts emission, and a method of making the honeycomb structure.

2. Description of the Related Art

Conventionally, a porous ceramic honeycomb structure has been used as a carrier for a catalyst composition for removing, for example, nitrogen oxides, carbon monoxide, and hydrocarbons in the exhaust gas of the internal combustion engine of an automobile. Recently, a honeycomb structure composed of a metallic material has drawn attention since the metallic honeycomb structure has high mechanical strength and heat resistance. The metallic honeycomb structure has two different types. One of the them is a so-called foil-type honeycomb structure that has a corrugated thin metal foil. The other type is a so-called extruded-type honeycomb structure that has a unitary structure formed by sintering an extruded body comprising a powder material.

As restriction of exhaust emission controls has been intensified, there has been a demand for heaters adapted to decrease pollutants during the initial running of the engine when the engine is not warmed up. The removal of hydrocarbons, carbon monoxide, nitrogen oxides while an exhaust gas is cold is particularly important since the catalyst composition has a low activity for oxidizing hydrocarbons in the cold exhaust gas. Moreover, during the initial running of the engine, the engine emits a large amount of pollutants as compared with during the steady continuous operation. Hence, it is preferable to heat the exhaust gas during the initial running of the engine by a preheater to a temperature at which the catalyst composition is sufficiently activated so as to convert pollutants in the exhaust gas.

An apparatus for controlling an exhaust gas of the engine in the exhaust system of an automobile may includes a preheater and a main catalyst element in the exhaust system, and the preheater is provided upstream of the main catalyst element.

U.S. Pat. No. 5,063,029 discloses a preheater and a catalytic converter. The preheater includes an electrically conductive honeycomb structure, at least two electrodes in electrical contact with the honeycomb structure, and a slit for adjusting electrical resistance of the honeycomb structure.

U.S. Pat. No. 4,576,800 discloses a honeycomb structure for loading a catalyst composition for an exhaust gas. The honeycomb structure has a limited geometric specific surface area so that an amount of the catalyst composition loaded onto a surface is limited.

Japanese Patent Application Laid-Open No. 4-148016 discloses a foil-type honeycomb heater that has characteristic features in connection between a flat thin sheet and a corrugated thin sheet so as to increase resistance to a thermal stress so that the honeycomb structure does not deform or crack easily.

Japan Patent Publication No. 58-23138 discloses a metallic substrate having an extended honeycomb structure so as to increase its geometric specific surface area for loading a catalyst layer. However, the more surface area increases a purification rate of pollutants only when rates of catalytic reactions of the pollutants are limited by the catalytic reactions itself.

Japan Patent Application Laid-Open No. 4-203416 discloses a foil-type honeycomb heater including a corrugated heater and a flat heater wherein the corrugated heater is meshed so as to adjust its electrical resistance.

However, the aforementioned related art overlooks that a contact of an exhaust gas with a catalyst composition is a factor to determine a purification rate of the exhaust gas. Even though a geometric specific surface area of a catalyst layer increases and an exhaust gas is quickly heated to an activating temperature of the catalyst, the exhaust gas needs to have a contact with the catalyst composition while the exhaust gas passes through passages in the honeycomb structure, and the contact of the exhaust gas with the catalyst composition may be a rate-determining step.

A Reynolds number is a parameter for a state of a fluid flow, and the fluid flow is classified into three states: a fast flow, a medium flow, and a slow flow. The Reynolds number for an exhaust gas passing through a typical honeycomb structure in the exhaust system ranges from about 30 to about 340, and the range comes under the medium flow. In the medium flow, a viscosity of the fluid itself cannot be ignored unlike a fast flow, and a transfer of the fluid in directions perpendicular to the flow direction is limited compared with the fast flow.

On the other hand, the fast flow corresponds to the Reynolds number larger than 1000. In the fast flow, a viscosity of the fluid can be ignored, and the fluid flow is turbulent so that fluid sufficiently transfers in directions perpendicular to the flow direction.

Japan Patent Application Laid-Open No. 3-118838 discloses a catalytic converter containing a foil-type honeycomb structure. The honeycomb structure has passages having a non-linear shape along its axial direction, such as a zigzag pattern, so as to mix a fluid stream. However, the mixture by the passage shape may have its limitation.

SUMMARY OF THE INVENTION

One aspect of the present invention provides a honeycomb structure for flowing fluid therethrough, having a periphery and two ends, including a plurality of passages which are defined by partition walls and extend in an axial direction between the ends, wherein the partition walls are formed of a plurality of through holes for forming turbulent flow so that the fluid pass through the through holes from one of the passages to the adjacent passage, each of the through holes having an open area of at least 0.25 $mm^2$.

Preferably, each of the through holes has an open area ranging from 0.28 to 3.14 $mm^2$. A sum of the open areas of the through holes ranges from 5% to 35% of a total surface area of the partition walls. Preferably, a sum of the open areas of the through holes may range from 10% to 25% of the total surface area of the partition walls.

Preferably, a honeycomb structure further comprises a catalyst composition coated onto a surface of the partition walls of the honeycomb structure, the catalyst composition comprising an inorganic oxide being resistant to heat and a catalytically active component loaded onto the inorganic oxide, the catalytically active component comprising an element selected from the group consisting of platinum, palladium, rhodium, and iridium.

The honeycomb structure may have a corrugated thin metal foil. Alternatively, the honeycomb structure may have a unitary structure formed by sintering an extruded body comprising a powder material.

Another aspect of the present invention provides a heating element for heating fluid flowing therethrough, comprising: a honeycomb structure having a periphery and two ends, including a plurality of passages which are defined by partition walls and extend in an axial direction between the ends, said honeycomb structure being electrically conductive; and means for applying electric current to said honeycomb structure so as to generate heat; wherein said partition walls are formed of a plurality of through holes for forming turbulent flow so that the fluid pass through said through holes from one of said passages to the adjacent passage, each of said through holes having an open area of at least 0.25 mm$^2$.

Preferably, at least one slit is formed through the partition walls. The means for applying electric current may comprise two electrodes in electrical contact with the honeycomb structure.

Another aspect of the present invention provides a thin sheet, comprising iron, chromium, and aluminum, wherein the thin sheet has a thickness up to 200 micrometers, the thin sheet is formed with a plurality of through holes, each of the through holes has an open area of at least 0.25 mm$^2$, and a sum of the open areas of the through holes ranges from 5% to 35% of a surface area of the thin sheet. Preferably, the sum of the open areas of the through holes ranges from 10% to 25% of a surface area of the thin sheet.

In the present invention, through holes are formed in partition walls defining passages of a honeycomb structure. As a result, when a stream of fluid passes through the passages, the stream becomes a turbulent flow by passing through the through holes so that fluid transfers in directions perpendicular to the axial direction of the passage. When a catalyst composition for controlling an exhaust gas is coated onto a surface of the perforated partition walls, the exhaust gas passing through the passages efficiently contacts the catalyst composition to improve the purification performance. Moreover, heat transfer increases in directions perpendicular to the axial direction of the passages so that the heater having the honeycomb structure has an improved efficiency in heating the fluid passing therethrough. When the honeycomb structure is used as a trap for particles, the particles adsorb to a greater extent on the surface.

Figure 7:
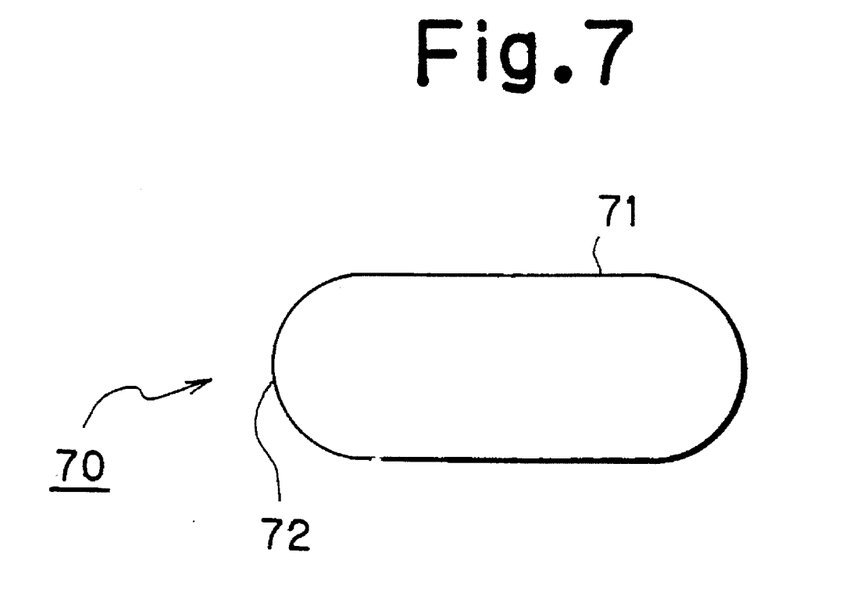
FIG. 7 is an example of a through hole.
Figure 8:
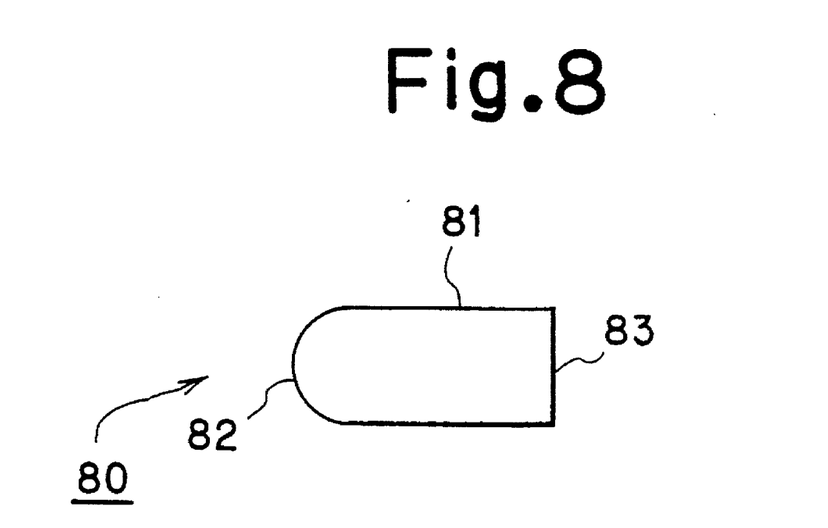
FIG. 8 is another example of a through hole.

A through hole may have a circle shape, an ellipse shape, and a shape 70 of a race track as shown in FIG. 7. The race-track shape 70 has a pair of parallel lines 71 and a pair of arcs 72, each of which connects the pair of parallel lines 71 at its both ends. Alternatively, the through hole may have a shape 80 of a half race track as shown in FIG. 8. The shape 80 has a pair of parallel lines 81, an arc 82 connecting the pair of parallel lines 81 in one end, and a straight line 83 connecting the pair of parallel lines 81 in the other end at an angle of about a right angle. Preferably, the through hole does not have a shape with a sharp corner since the sharp corner may reduce mechanical strength of the honeycomb structure. This is particularly the case with the honeycomb structure made of a ceramic material.

In the present invention, each of the through holes has an open area of at least 0.25 mm$^2$. When the through hole is smaller than 0.25 mm$^2$, a stream of fluid passing the through hole is not sufficiently turbulent so that mass transfer is limited in directions perpendicular to an axial direction of passages.

Preferably, each of the through holes has an open area ranging from 0.28 to 3.14 mm$^2$. When the through hole has a circle shape, this range corresponds to a diameter ranging from 0.6 to 2.0 mm. When the through hole has an open area larger than 3.14 mm$^2$, the honeycomb structure may have reduced its mechanical strength, and the honeycomb structure may only load a limited amount of a catalyst composition on a surface of partition walls. When the honeycomb heater is used as a preheater of a catalytic converter for controlling automobile exhaust emission, each of the through holes preferably has an open area ranging from 0.45 to 1.71 mm$^2$. When the through hole has a circle shape, this range corresponds to a diameter ranging from 0.76 to 1.5 mm.

BRIEF DESCRIPTION OF THE DRAWING

The invention is described in greater detail below with reference to the enclosed drawings in which:

FIG. 1 (*a*) is a transverse cross-sectional view of a foil-type honeycomb heater of the present invention;

FIG. 1 (*b*) is an expansion of a section A in FIG. 1 (*a*);

FIG. 2(*a*) is an example of a front view of a perforated thin sheet;

FIG. 2(*b*) is another example of a front view of a perforated thin sheet;

FIG. 4(*a*) is a longitudinal view with a partial cross-sectional view of an extruded-type honeycomb structure of the present invention;

FIG. 4(*b*) is a perspective view of a line X—X and another line Y—Y;

FIG. 4(*c*) is a perspective view of a line Z—Z and another line U—U;

DETAILED DESCRIPTION OF THE INVENTION

Figure 1A:
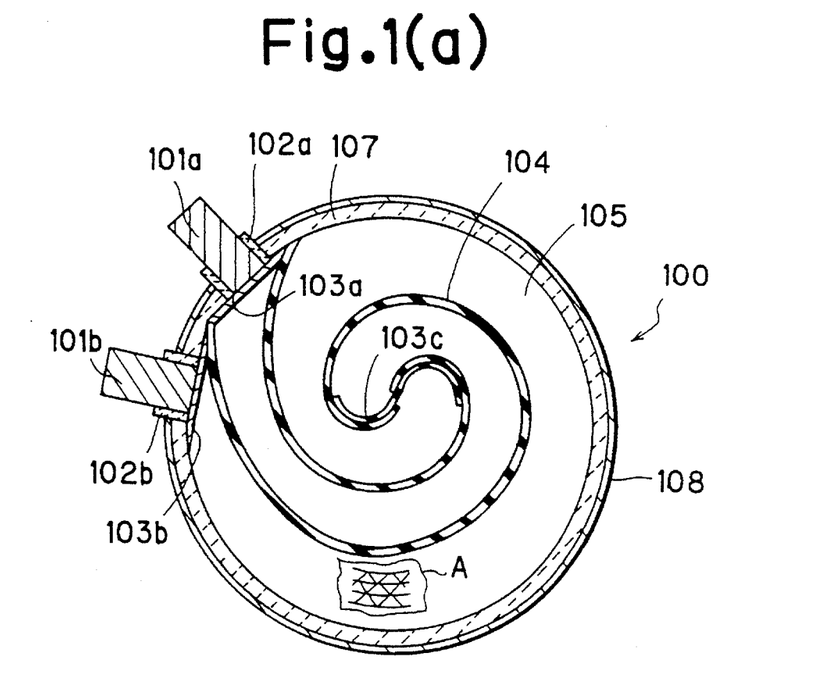

In FIG. 1 (*a*), a honeycomb heater 100 has an outer metallic housing 108, for example, steel, which may be circular in cross section. The housing 108 contains a honeycomb structure 105 that is made of corrugated thin metal foil. The honeycomb structure 105 is electrically isolated from the metallic outer shell of the housing 108 by an insulation 107, and the insulation 107 may be a ceramic mat.

The corrugated thin metal foil 105 has a spiral shape, and one spiral layer is separated from another spiral layer that is adjacent in a radial direction by insulation 104. In the center of the honeycomb structure 105, an electrical conductor 103*c* ensures electrical connection through spiral layers separated by the insulation 104.

Electrical power is supplied to the honeycomb structure 105 by electrodes 101*a* and 101*b*, which protrude from the housing 108. The honeycomb structure 105 serves as an electrical resistance between the electrodes 101*a* and 101*b* so as to generate heat. Plates 103*a* and 103*b* ensure electrical connection of electrodes 101*a* and 101*b* with the honeycomb structure 105.

Figure 1B:
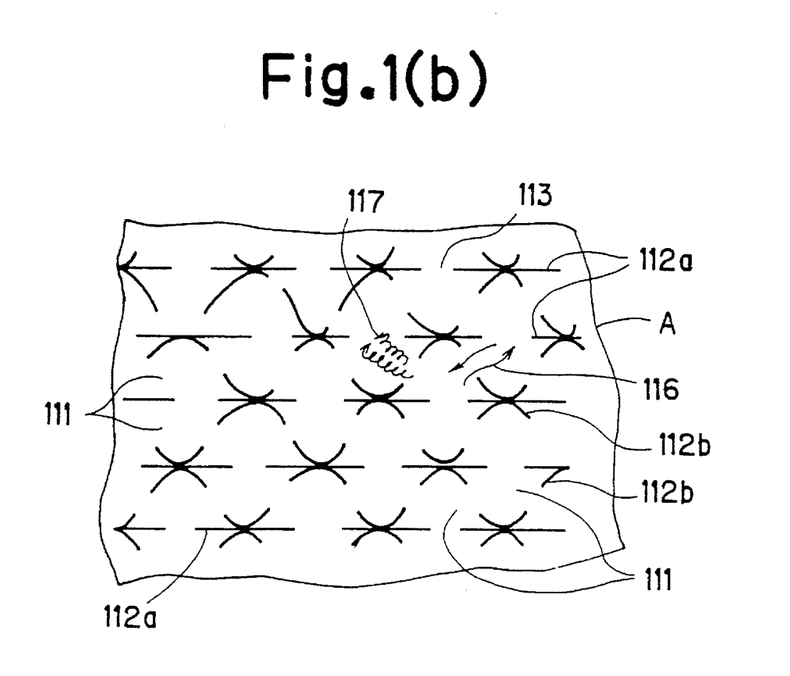

FIG. 1(b) is an expansion of a part of FIG. 1(a). Partition walls 112a and 112b define a plurality of passages 111 for passing fluid therethrough. Partition walls 112a and 112b are perforated with through holes 113 so that a stream of fluid pass the through hole 113 from one passage 111 to an adjacent passage 111 so as to create a turbulent flow. As a result, there is a sufficient mass and heat transfer in directions perpendicular to the axial direction of the passage. The through holes 113 may create an eddy 117.

In the foil-type honeycomb structure of FIG. 1(a) and FIG. 1(b), the corrugated thin metal foil is made by laminating pairs of a perforated flat thin sheet 112a and a perforated corrugated thin sheet 112b and then rolling the laminate. Alternatively, the corrugated thin metal foil may be made from perforated corrugated thin sheets without including a flat thin sheet.

In the foil-type honeycomb structure, the partition wall preferably has a thickness up to 200 micrometers. In other words, a thin sheet, which is a starting material of the honeycomb structure, preferably has a thickness up to 200 micrometers. On the other hand, an open area of 0.25 mm$^2$ in a through hole corresponds to a diameter of about 0.56 mm when the through hole has a circle shape. Therefore, the thickness of 200 micrometers is smaller than a half of the diameter of the through hole. Under the conditions, an area for a side surface defining the through hole in the partition walls is smaller than the open area of the through hole so that to perforate a thin sheet does not increase but decreases a surface area of the thin sheet. The perforated thin sheet of the present invention differs from the thin sheet of Japan National Publication No. 3-500911 of an international application wherein the thin sheet is perforated so as to increase the surface area.

In the present invention, preferably a sum of the open areas of the through holes ranges from 5% to 35% of a total surface area of the partition walls. In the foil-type honeycomb structure, the corrugated thin metal foil is made from a perforated thin sheet, and a sum of the perforation may range from 5% to 35% of the surface area of the thin sheet before perforation. In other words, an unperforated thin sheet has two opposite surfaces, and the range of the perforation is proportional to the total surface area of one of the two opposite surfaces of the unperforated thin sheet. When the range of the perforation is larger than 35%, the mechanical strength of the honeycomb structure may be reduced, and the honeycomb structure may have a limited amount of a catalyst loaded on a surface of partition walls. On the other hand, when the range of the perforation is smaller than 5%, a stream of fluid passing the through hole is not sufficiently turbulent so that a mass transfer is limited in directions perpendicular to an axial direction of passages.

Preferably, a sum of the open areas of the through holes may range from 10% to 25% of the total surface area of the partition walls, and further preferably, a sum of the open areas of the through holes may range from 10% to 17% of the total surface area of the partition walls. These narrower ranges are particularly favorable in the extruded-type honeycomb structure.

In both the foil-type honeycomb structure and the extruded-type honeycomb structure, an arrangement of the through holes may be such that the through holes are repeated systematically, for example, periodically with fixed intervals. Without the systematic arrangement, a larger thermal stress may be imposed on a local area of the honeycomb structure than the other local areas, and the local area may have a reduced mechanical strength than the other local areas.

In the foil-type honeycomb structure, through holes may be periodically arranged in a thin sheet along any imaginary line with a fixed interval, and the line includes, for example, a straight line, a spiral, a circle, an eclipse, etc. A series of the one-dimensional line is combined to arrange through holes in a two-dimensional surface.

Figure 2A:
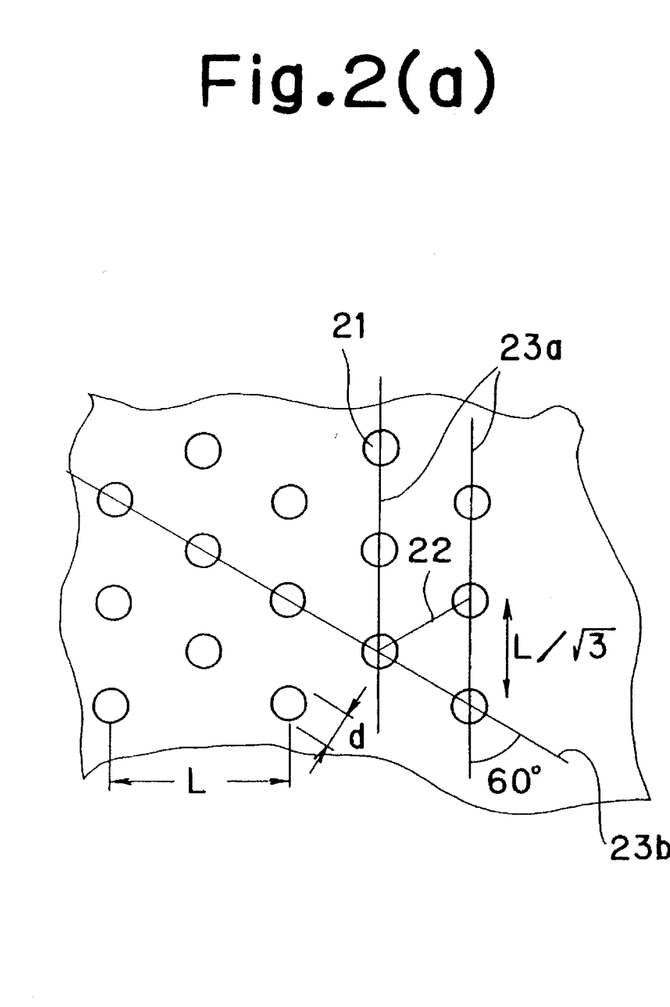
Figure 2B:
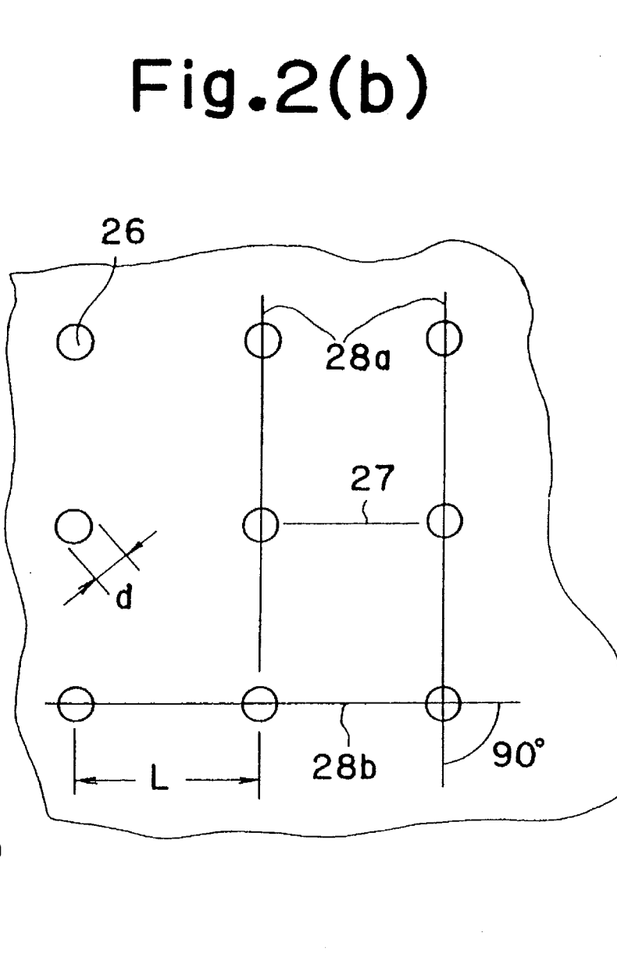

FIGS. 2(a) and 2(b) show examples of the arrangement of through holes in perforated flat thin sheets, and through holes are periodically arranged along parallel straight lines with a certain interval. In FIG. 2(a), through holes 21 are arranged in the corners of an equilateral triangle 22, and the equilateral triangle is periodically repeated. In FIG. 2(b), through holes 26 are arranged in the corners of a square 27, and the square is periodically repeated. The through holes 21, 26 have a circle shape having a diameter of d and an open area of $3.14d^2/4$.

In other words, in FIG. 2(a), through holes 21 are periodically repeated along a set of parallel straight lines 23a with an interval, and the set of parallel lines 23a cross another set of parallel straight lines 23b at an angle of about 60 degrees. The centers of the through holes 21 are arranged in intersections of the two sets of lines. In FIG. 2(b), a set of parallel straight lines 28a cross another set of parallel straight lines 28b at about right angle, and the center of the through holes 26 are arranged in intersections of the two sets of the lines. When through holes are arranged at intersections of two sets of parallel straight lines, the one set of parallel straight line preferably takes at an angle to the other set of parallel straight line ranging from 20 to 80 degrees, further preferably ranging from 30 to 70 degrees, considering mechanical strength and thermal stress of the honeycomb structure.

Figure 3:
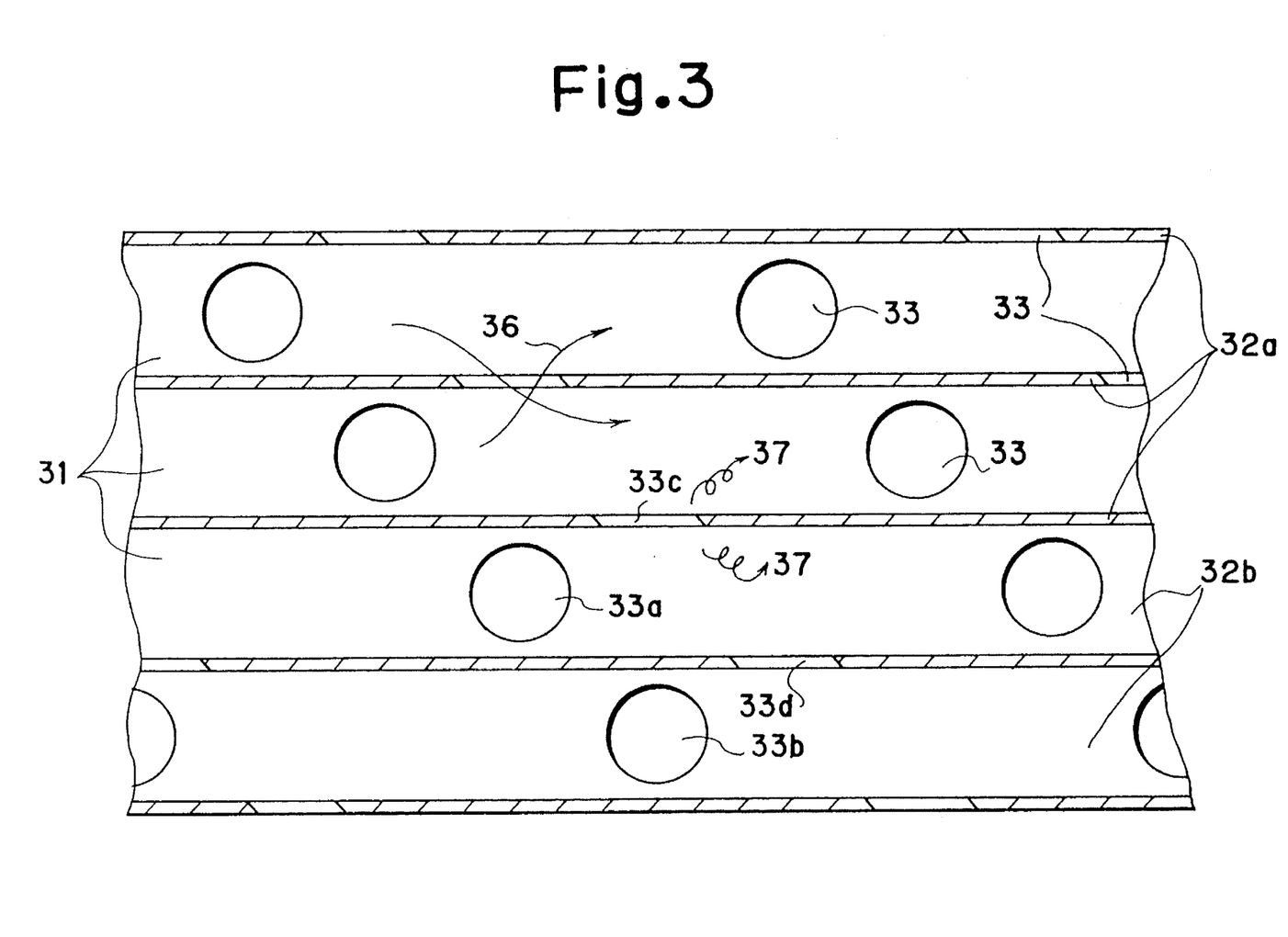
FIG. 3 is a longitudinal cross-sectional view of an extruded-type honeycomb structure of the present invention.
Figure 5:
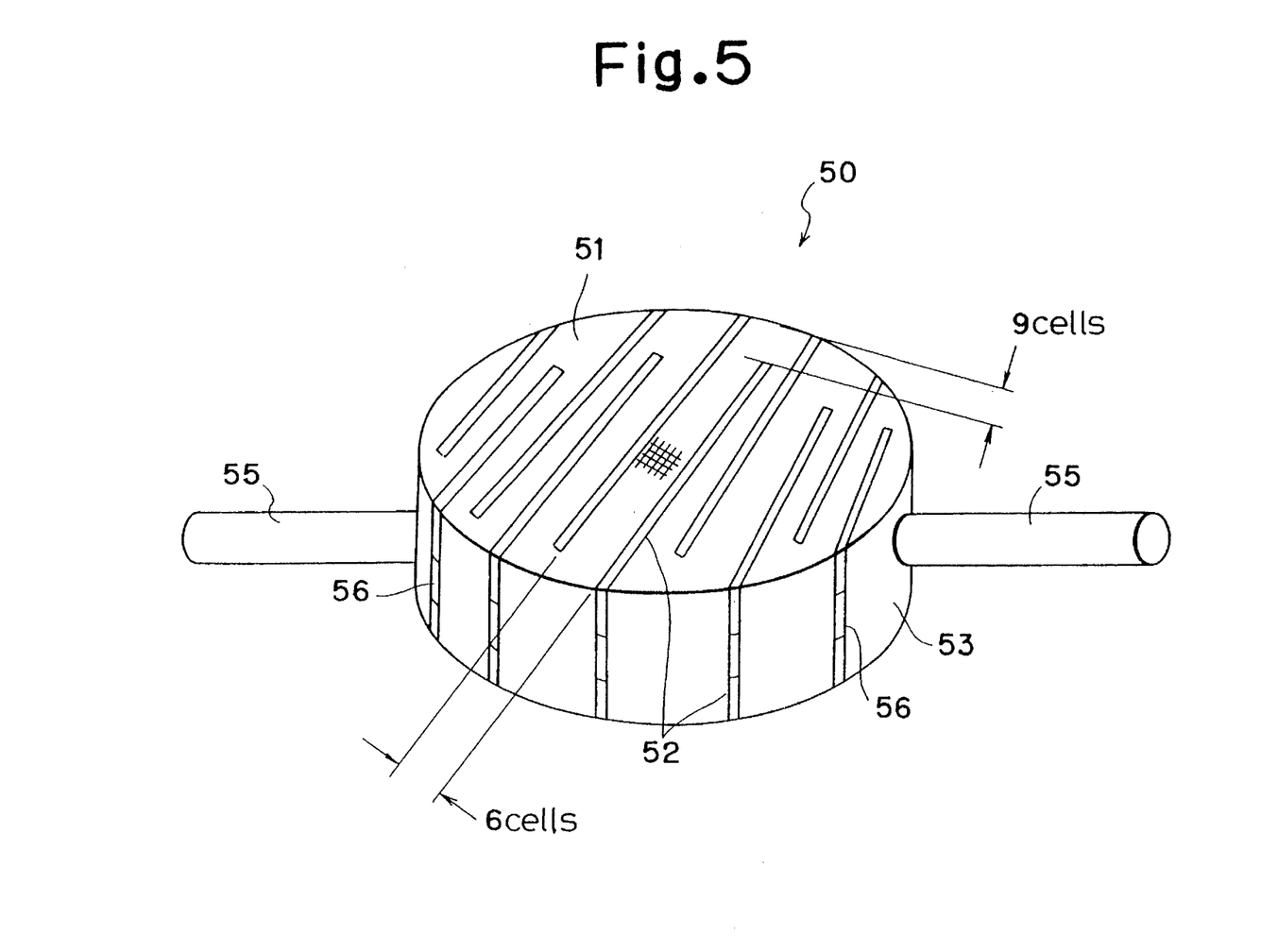
FIG. 5 is a perspective view of a honeycomb heater of the present invention.

FIG. 3 is a longitudinal cross-sectional view of an extruded-type honeycomb structure of the present invention. In the embodiment of FIG. 3, a honeycomb structure is a unitary structure formed by sintering an extruded body comprising a powder material. An example of the extruded-type honeycomb structure 51 is shown in FIG. 5.

In FIG. 3, partition walls 32a and partition walls 32b define passages 31 having a square shape in directions perpendicular to the axial direction of the passages 31. Partition walls 32a intersect partition walls 32b at substantially a right angle. Partition walls 32a, 32b are formed of through holes 33 so that fluid passes through holes 33 from one passage to an adjacent another passage so as to create a turbulent flow in a stream of the fluid. The through holes 33 may cause an exchange 36 of a fluid between adjacent passages and create an eddy 37.

Preferably, through holes are not arranged such that a direction of a series of through holes is perpendicular to an axial direction of passages since the arrangement decreases mechanical strength of the honeycomb structure. In FIG. 3, a series of through holes 33c, 33d penetrating partition walls 32a shares the same direction at an angle of about 45 degrees to the axial direction of passages 31. A series of through holes 33a, 33b penetrating partition walls 32b takes an angle of about 45 degrees to the axial direction of the passages 31. A series of through holes may be arranged in a direction at an angle ranging from 10 to 80 degrees, preferably ranging from 20 to 70 degrees, to the axial direction of passages.

In the embodiments of FIG. 1(b) and FIG. 3, through holes 113, 33 in partition walls 112a, 112b, 32 connect passages that are adjacent in directions perpendicular to an axial direction of passages. Alternatively, in the embodiment of FIG. 4, through holes 45 connect passages that are adjacent in the axial direction.

Figure 4A:
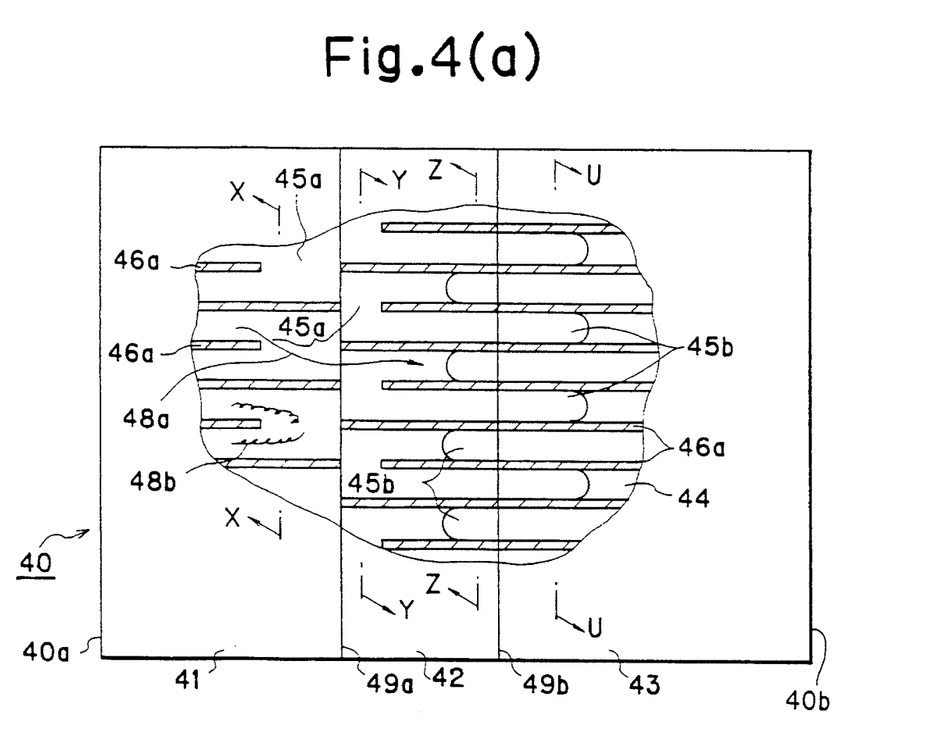

In FIG. 4(a), an extruded-type honeycomb structure 40 having a cylindrical shape includes an upper portion 41, a mid portion 42, and a lower portion 43, and the three portions 41, 42, and 43 are integrally connected along an axial direction of the unitary honeycomb structure 40. Through holes 45a, 45b are formed in partition walls 46a, 46b at connections 49a, 49b of the portions 41, 42, and 43 so that a stream 48a of fluid passes through the through holes. In each of the portions 41, 42, and 43, partition walls 46a and partition walls 46b define passages 44 having a square shape in directions perpendicular to the axial direction of the passages 44. Partition walls 46a intersects partition walls 46b at substantially right angle. An axial direction of passages 44 in any of the portions 41, 42, and 43 is substantially the same as an axial direction of the honeycomb structure To make the honeycomb structure of FIG. 4(a), a powder material is extruded to form three green honeycomb structures, and partition walls in ends of the three green honeycomb structures are machined so as to form through holes 45a, 45b. Then the three green honeycomb structures are connected at connections 49a, 49b and sintered so as to form a unitary structure 40.

In a lower end of the upper portion 41, every other partition wall 46a that runs a direction penetrating through the drawing sheet in FIG. 4(a) is machined so as to form through holes 45a connecting two adjacent passages 44. In the upper end of the mid portion 42 at connection 49a, partition walls 46a are machined in the same way as the end of the upper portion 41 at the connection 49a.

In contrast, in the lower end of the mid portion 42, every other partition walls 46b that runs a horizontal direction is machined so as to form through holes 45b connecting two adjacent passages. In an upper end of the lower portion 43 that connects to the end of the mid portion 42, partition walls 46b are machined in the same way as the end of the mid portion 42 at connection 49b.

A stream of fluid passes through the honeycomb structure 40 from one end 40a to the other end 40b. The fluid passes through the through holes 45a, 45b, for example, the stream 48a, so that mass and heat transfers in directions perpendicular to the axial direction of the passages 44. Through holes 45a at the connection 49a may create an eddy 48b.

In the present invention, the honeycomb structure may have any shape, including a cylindrical shape and a box shape. The honeycomb structure has partition walls defining passages. The passages may have various shapes in a cross section perpendicular to the axial direction. The shape includes a circle, a polygon including a square, a rectangle, a hexagon, a corrugated shape, etc. The passages preferably have a density of 6 to 1,500 passages per square inch, which corresponds to 0.9 to 233 passages per square centimeter. It is further preferable to have 20 to 1000 passages per square inch. Preferably, the partition walls have a thickness ranging from 50 to 2000 micrometers, and further preferably ranging from 50 to 500 micrometers.

In the present invention, the honeycomb structure may be made of any material that generates heat when electric current is applied to the honeycomb structure. In this sense the material may be metallic or ceramic. However, the metallic material is preferred in view of mechanical strength. Examples of such metals include stainless steel and compositions of Fe—Cr—Al, Fe—Cr, Fe—Al, Fe—Ni, W—Co, Ni—Cr. Among these metals, Fe—Cr—Al, Fe—Cr, and Fe—Al are preferred because of their low costs and their high resistance to heat, oxidation and corrosion.

These compositions recite only main elements, and these compositions may contain a small amount of B, Si, C, Y, Mo, Zr, W, and other unavoidable impurities. The composition may be those disclosed in U.S. Pat. No. 5,427,601. In the foil-type honeycomb structure, thin sheets have the composition. In the extruded-type honeycomb structure, a raw powder is mixed so as to have a desired composition.

The honeycomb structure may or may not be porous. When a catalyst composition is loaded onto a surface of partition walls, a honeycomb structure is preferably porous thereby ensuring close adherence of the catalyst composition to the surface of the partition walls. Moreover, the catalyst composition formed on the porous honeycomb structure is less prone to peeling off due to a difference in thermal expansion between the honeycomb structure and the catalyst composition.

The honeycomb structure may be provided with electrodes for applying electric current to the honeycomb structure so as to generate heat so as to form a heating element. The heating element heats a stream of fluid passing through the honeycomb structure. The honeycomb structure for the heating element is electrically conductive.

As Japan patent application No. 3-65420 and U.S. Pat. No. 5,465,57, application Ser. No. 08/091,917 disclose, the heating element may include a plurality of honeycomb structures that are electrically connected, and fluid passes through each of the honeycomb structures. The honeycomb structures may be electrically connected by an electrically conductive plate.

The honeycomb structure preferably has a mechanism for adjusting electrical resistance so that the honeycomb structure has an electrical resistance ranging from 0.001 to 0.5 ohms, and further preferably from 0.01 to 0.1 ohms.

The mechanism for adjusting electrical resistance includes, for example, (1) a slit or slits of any length, formed in any direction at any position of the honeycomb structure;

(2) variations in the length of partition walls along the axial direction of passages of the honeycomb structure;

(3) variations in the thickness of partition walls of the honeycomb structure or variations in a number of passage in a transverse unit area, i.e. a cell density; and (4) a slit or slits formed in the cell wall (rib) of the honeycomb structure. Japan Patent Application Laid-Open No. 3-295184 discloses the mechanism for adjusting electrical resistance.

Preferably, in the honeycomb structure, a surface of the partition walls and pores in the surface of the partition walls may be coated with metallic oxide resistant to heat, for example, $Al_2O_3$, $Cr_2O_3$, $ZrO_2$, etc. so as to improve resistance to heat, oxidation, and corrosion. Where a catalyst composition is loaded onto the honeycomb structure, the catalyst composition may be loaded onto the coating layer. These metallic oxide may serve as a carrier to load the catalytically active component.

Preferably, a surface of the partition walls is coated with a catalyst composition for adsorbing pollutants in an exhaust gas or for converting pollutants into harmless substances. The catalyst composition includes an inorganic oxide being resistant to heat and a catalytically active component loaded onto said inorganic oxide. The inorganic oxide serves as a carrier for the catalytically active component, and the inorganic oxide preferably has a large surface area. The inorganic oxides include, for example, $\gamma$-$Al_2O_3$, $TiO_2$, $SiO_2$—$Al_2O_3$, and an oxide having a perovskite structure. The catalytically active component includes a noble metal such as platinum, palladium, rhodium, and iridium as well as a base metal, such as Cu, Co. The catalyst composition may be 10 to 100 gram of Pt and Pd loaded onto $\gamma$-$Al_2O_3$ per cubic feet of the honeycomb structure.

In the foil-type honeycomb structure, a thin sheet is perforated by a suitable method such as punching. The thin sheet may contain iron, chromium, and aluminum, and the thin sheet may have a thickness up to 200 micrometers. Each of the through holes has an open area of at least 0.25 $mm^2$, and a sum of said open areas of the through holes range from 5% to 35% of a surface area of the thin sheet.

A method of manufacturing an extruded-type honeycomb structure made of a metal is disclosed hereinafter.

First, an iron powder, an aluminum powder, a chromium powder and/or powders of alloys of these metals are mixed to prepare a mixture having a desired composition. The mixture is mixed with an organic binder (e.g. methyl cellulose or polyvinyl alcohol) and water to produce a readily formable mixture, and the readily formable mixture is extruded through an extrusion die to obtain a green compact of a desired honeycomb shape.

When the metal powder mixture is mixed with an organic binder and water, an antioxidant such as oleic acid or the like may be added to the metal powder mixture prior to the addition of the water. Alternatively, metal powders may have been treated in advance so as to increase oxidation resistance.

Next, the green compact having a honeycomb shape is fired in a non-oxidizing atmosphere at a temperature ranging from 1,000° C. to 1,450° C. to give a honeycomb structure. The atmosphere during the firing step preferably contains hydrogen so that the organic binder is decomposed and removed with iron or the like acting as a catalyst thereby a good sintered body can be obtained.

Firing at a temperature lower than 1,000° C. dose not sinter the green compact. On the other hand, firing at a temperature higher than 1,450° C. deform the resulting sintered honeycomb structure.

A following steps apply to both the extruded-type honeycomb structure and the foil-type honeycomb structure.

Preferably, a heat-resistant inorganic oxide such as $Al_2O_3$, $Cr_2O_3$, $ZrO_2$ or the like is coated onto surfaces of partition walls and pores in the surfaces of the partition walls of the sintered honeycomb structure so as to improve the heat resistance. The inorganic oxide can preferably be coated onto partition walls of the honeycomb structure by one of the following methods.

(1) The sintered body having a metal honeycomb structure is subjected to a heat treatment in an oxidizing atmosphere at a temperature ranging from 700° C. to 1,100° C.

(2) Surfaces or open pores of the partition walls are plated with a metal such as aluminum or the like, and then the sintered body is subjected to a heat treatment in an oxidizing atmosphere at a temperature ranging from 700° C. to 1,100° C. The plating includes electroplating, a gas phase plating, and a physical or chemical vapor deposition.

(3) The sintered honeycomb structure is immersed in a molten metal such as molten aluminum or the like, and then the sintered honeycomb structure is subjected to a heat treatment in an oxidizing atmosphere at a temperature ranging from 700° C. to 1,100° C.

(4) Surfaces of the partition walls of the sintered honeycomb structure is coated with a sol containing a suitable metal such as aluminum or the like, and then the sintered honeycomb structure is subjected to a heat treatment in an oxidizing atmosphere at a temperature ranging from 700° C. to 1,100° C.

Preferably, the above heat treatment is conducted at a temperature ranging from 900° C. to 1,100° C. in view of resistance to heat and oxidation.

Slits may be formed through partition walls in any length, any position, and any direction. Electric current is obstructed by the slits so that electrical resistance of the honeycomb structure is adjusted.

Means for applying electric current to the honeycomb structure, such as electrodes or the like is provided to an outer periphery of the honeycomb structure or an inside of the honeycomb structure by brazing, welding or the like so that the electrodes are in electrical contact with the honeycomb structure.

A step of forming through holes in the honeycomb structure may be carried out in any time after forming a powder material into a green compact and before encasing the sintered honeycomb structure. For example, a green compact having a honeycomb shape may be machined by a drill so as to form through holes. Alternatively, a sintered honeycomb structure may be machined prior to coat metallic oxide resistant to heat onto a surface of the partition walls.

EXAMPLES

Examples 1–5, Comparative Examples 1–3

In Examples 1–5 and Comparative Examples 1–3, the foil-type honeycomb structure was made. Flat thin sheets having a thickness of 50 micrometers were used. The flat thin sheets had a composition of Fe-22Cr-5Al (percent by weight). In Examples 1–5 and Comparative Examples 2–3, the flat thin sheets were perforated in the pattern of FIG. 2(a). Through holes 21 are arranged in the corners of an equilateral triangle 22, and the equilateral triangle is periodically repeated. In contrast, in Comparative Example 1, thin sheets were not perforated.

A "distance" in Table 1 refers to the distance between two adjacent through holes, and the distance is equal to L minus d, wherein L is a pitch between the two adjacent through holes, and d is a diameter of the through holes. In the arrangement of FIG. 2(a) with through holes 21 having a circle shape, the area ratio $=272\times(d/L)^2$, wherein the area ratio refers to a ratio of a sum of the open areas of said through holes to a surface area of the thin sheet.

Some of the perforated flat thin sheets were pressed into perforated corrugated thin sheets. Pairs of the perforated flat thin sheet and the perforated corrugated thin sheet were laminated in turn, as shown in FIG. 1(b), and the pairs of the sheets with insulation 104 were rolled into a spiral to a cylindrical shape in FIG. 1(a). Surfaces of both ends of the honeycomb structure were brazed by Ni brazing. The honeycomb structure had an outer diameter of 90 mm, an axial length of 40 mm, a thickness in the partition walls of 50 micrometers, and 580 passages per square inch in a transverse cross section perpendicular to the axial direction.

A $\gamma$-$Al_2O_3$ powder and a $CeO_2$ powder were mixed at a weight ratio of 70:30. The mixture was further mixed with water and a small amount of nitric acid, followed by wet grinding to prepare a carrier slurry. The honeycomb structure was dipped into the carrier slurry to coat a washcoat layer on surfaces of partition walls. T,he honeycomb structure was dried and then fired at 500° C., thereby partition walls were coated with a carrier consisting of $\gamma$-$Al_2O_3$ and $CeO_2$. The resulting honeycomb structure was immersed into an aqueous solution containing chloroplatinic acid and rhodium nitrate for about 20 minutes so as to load catalytically active components composed of platinum and rhodium of 5:1 (molar ratio), on the carrier consisting of γ-$Al_2O_3$ and $CeO_2$. A total loaded amount of platinum and rhodium is 40 grams per square cube of the honeycomb structure.

Electric plates 103a and 103b were welded to the honeycomb structure 105, and terminals 102a and 102b were welded to the electric plates 103a and 103b, respectively. Ceramic rings 102a and 102b surrounds side surfaces of electrodes 101a and 101b, respectively.

the honeycomb heater for 10 minutes, and then an air at room temperature passed through the honeycomb heater for another 10 minutes. This temperature cycle of 900° C. and room temperature was repeated fifty times so as to evaluate effects of frequent temperature changes on the honeycomb heater. The honeycomb structure of the honeycomb heater was visually inspected for cracks and deformation.

These results are tabulated in Table 1.

TABLE 1

| | through holes | | | purification rate | | | | | | thermal stress test |
|---|---|---|---|---|---|---|---|---|---|---|
| | area ratio (%) | shape | open area (mm²) | distance (mm) | energized | | | not energized | | | |
| | | | | | HC | NOx | CO | HC | NOx | CO | |
| Comp. Ex. 1 | 0 | — | — | — | 35 | 41 | 52 | 43 | 45 | 68 | crack |
| Comp. Ex. 2 | 2 | circle | 0.28 | 6.4 | 36 | 40 | 52 | 42 | 45 | 69 | crack |
| Example 1 | 5 | circle | 0.28 | 3.8 | 49 | 50 | 55 | 52 | 58 | 70 | no crack |
| Example 2 | 10 | circle | 1.77 | 6.3 | 59 | 67 | 70 | 72 | 82 | 88 | no crack |
| Example 3 | 17 | circle | 0.78 | 3.0 | 63 | 70 | 77 | 78 | 86 | 92 | no crack |
| Example 4 | 25 | circle | 0.50 | 1.8 | 55 | 62 | 65 | 61 | 65 | 84 | no crack |
| Example 5 | 35 | circle | 3.14 | 3.6 | 41 | 45 | 53 | 48 | 48 | 71 | no crack |
| Comp. Ex. 3 | 51 | circle | 1.77 | 2.0 | 25 | 39 | 32 | 33 | 40 | 50 | deformed |

A ceramic mat 107, which serves as an insulator, covered the periphery of the honeycomb structure 105, and a housing made of stainless steel encased the ceramic mat 107 to form a honeycomb heater loading the catalyst composition. The honeycomb heater had an electrical resistance ranging from 0.03 to 0.1 ohms.

Purification Performance

Figure 6:
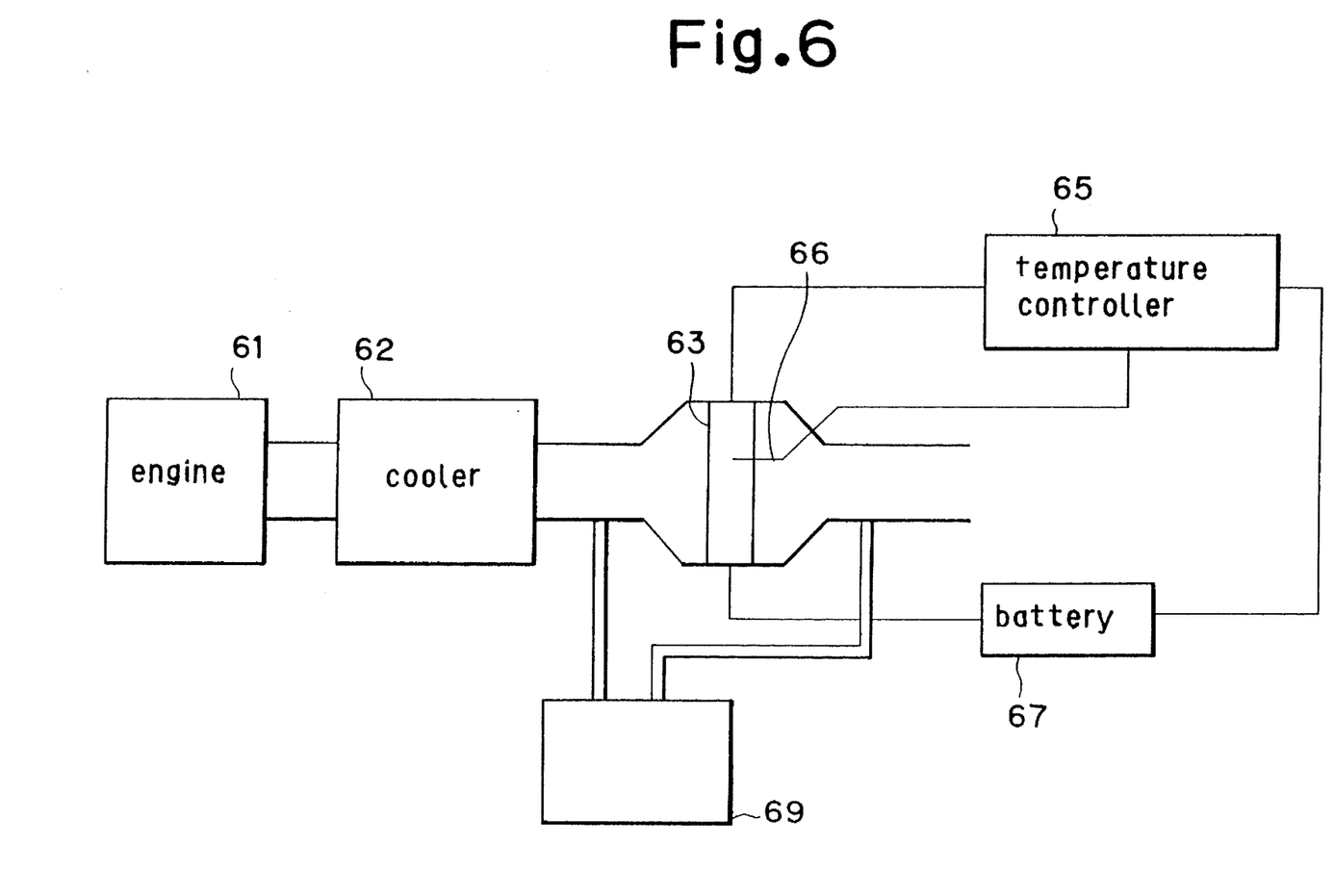
FIG. 6 is a schematic view of an apparatus for evaluating purification performance of a honeycomb heater.

FIG. 6 is a schematic view of an apparatus for evaluating a purification performance of the honeycomb heaters of the Examples and Comparative Examples. In each honeycomb heater, electric power is supplied to the honeycomb heater after the engine starts so as to heat a cold exhaust gas in one run, and electric power is not supplied to the honeycomb heater in the other run. An engine 61 fueled by gasoline emits an exhaust gas, and the exhaust gas was cooled by a cooler 62 to 120° C. The cold exhaust gas was introduced into the honeycomb heater 63. Samples of the exhaust gas were taken in an upstream and a downstream of the honeycomb heater 63 so that amounts of hydrocarbons, carbon monoxide, and nitrogen oxides were measured by a measuring equipment 69 so as to determine the purification ratio of these pollutants.

When the electric power was not applied to the honeycomb heater 63, purification ratios of hydrocarbons, carbon monoxide, and nitrogen oxides were measured by a measuring equipment 69 over a period of 60 seconds, and the average of the purification ratio over the period is shown in Table 1.

On the other hand, when the electric current was applied to the honeycomb heater 63, a temperature control 65 controls a battery 67 with 12 volts supplying electric power to the honeycomb heater 63 so that a thermocouple 66 inserted into the honeycomb structure of the honeycomb heater 63 keeps at 350° C. The temperature control 65 either turned on or turned off the battery 67. The electric power was applied to the honeycomb heater for a period of 60 seconds, and the average of the purification ratio over the period is shown in Table 1.

After the purification test, a test for thermal stress was carried out. A propane gas burning at 900° C. passed through Examples 6–8, Comparative Examples 4–5

In Examples 6–8 and Comparative Examples 4–5, the extruded-type honeycomb structure was made.

A Fe powder, a Cr-Al powder (Al: 30% by weight), a Fe-Al powder (Al: 50% by weight), a Fe-B powder (B: 20% by weight) and a $Y_2O_3$ powder, all having an average particle diameter up to 44 micrometers, were mixed to have a composition of Fe-16Cr-8Al-0.05B-0.5$Y_2O_3$ (% by weight). The mixture in 100 parts by weight was further mixed with methyl cellulose in 4 parts by weight as an organic binder and oleic acid as an antioxidant in 1 part by weight to prepare a readily formable mass. The mass was extruded through an extrusion die to obtain a green compact of a honeycomb structure having a cylindrical shape.

The green compact was dried in the air at 90° C. for 16 hours and then kept in a hydrogen atmosphere at 1,325° C. for 2 hours so as to sinter the green compact. The sintered honeycomb structure was heat-treated in the air at 1,150° C. for 30 minutes.

The resulting honeycomb structure 50 (as shown in FIG. 5) had an outer diameter of 90 mm, an axial length of 40 mm, a thickness of partition walls of 100 micrometers, and 580 passages having a square shape per square inch in a transverse cross section perpendicular to the axial direction. The honeycomb structure had a porosity of about 22% and an average pore diameter of 5 micrometers.

Figure 4B:
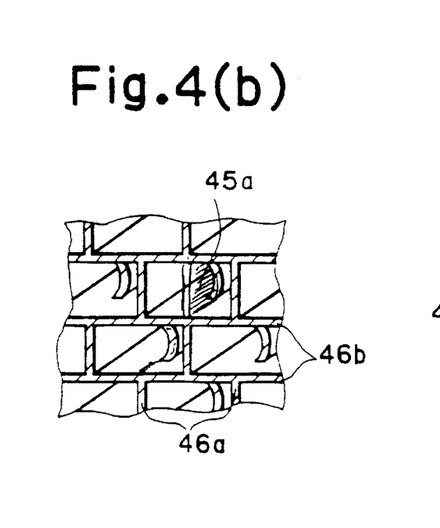
Figure 4C:
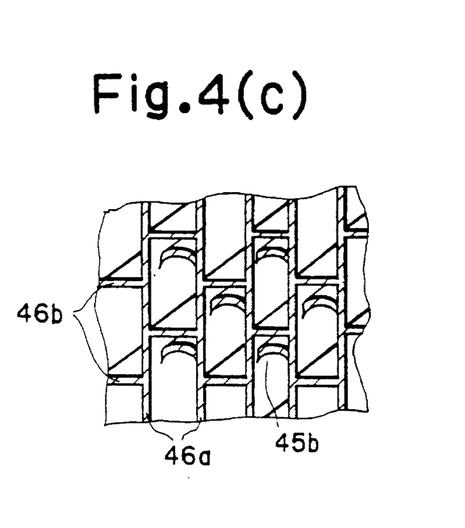

In Example 8, the honeycomb structure of FIGS. 4(a), 4(b) and 4(c) were made. Three green compacts having a cylindrical shape were independently extruded, and the green compacts were dried. Then partition walls in ends of the three green honeycomb structures were machined so as to form through holes 45a, 45b.

In a lower end of the upper green compact 41 and an upper end of the middle green compact 42, as shown in FIG. 4(b), every other partition walls 46a was machined so as to form through holes 45a connecting two adjacent passages 44. In the lower end of the mid green compact 42 and an upper end of the lower green compact 43, as shown in FIG. 4(c), every other partition walls 46b that runs a horizontal direction was machined so as to form through holes 45b connecting two adjacent passages.

Each of the through holes 45a and 45b in both ends of the mid green compact 42 had an area of 2.79 mm², and each of the through holes 45a and 45b in one end of the upper green compact 41 and the lower green compact 43 had an area of 5.79 mm². The through holes 45a and 45b had a shape 80 of a half race track in FIG. 8.

The machined green compacts were connected at connections 49a, 49b and sintered so as to form a unitary structure 40.

The honeycomb structure 51 was cut with a diamond saw to form, as shown in FIG. 5, ten slits 52 parallel to the axial direction of the passages so that a number of cells or passages between two adjacent slits 52 is six. Nine cells remained uncut between the termination of each slit 51 and the periphery 53 of the honeycomb structure 51.

The honeycomb structure 51 was drilled so as to form through holes in directions that differ from the axial direction of the passages and directions perpendicular to the axial direction. The area ratio (%) of the through holes, a shape of the through holes, and an area of each through holes (mm²) are tabulated in Table 2.

A surface of partition walls in the honeycomb structure 51 thus formed was coated with a carrier consisting of $\gamma$-$Al_2O_3$ and $CeO_2$, and catalytically active components composed of platinum and rhodium of 5:1 (moral ratio) were loaded on the carrier in the same manner as the foil-type honeycomb structure.

Next, two electrodes 55 serving as terminals were fitted by welding to an outer periphery of the honeycomb structure 51. A plate made of zirconia ceramics was inserted to each of the slits 52 to serve as a spacer so that both sides of the slit 52 do not contact and short. A metallic band covers the periphery 53 and an annular edge of both ends of the honeycomb structure 51 so that fluid can pass through the central portions, as disclosed in U.S. Pat. No. 5,202,548. A ceramic mat was provided between the metallic band and the honeycomb structure 51.

The extruded-type honeycomb heater loading a catalyst composition was measured for purification performance and the thermal stress test. The results are tabulated in Table 2.

position to improve the purification performance. Moreover, the through holes absorbs local strains caused by stresses and thermal shock so that the honeycomb structure is less prone to crack and deformation. Furthermore, a size and a pattern of the through holes may be changed to adjust the electrical resistance of the heating element, and the honeycomb structure has a less weight due to the through holes.

As is readily apparent from the above description, additional advantages and modifications will readily occur to one skilled in the art. The invention in its broader aspects is therefore not limited to the specific examples shown and described. Accordingly, departures may be made from the details shown in the example without departing from the spirit or scope of the disclosed general inventive concept.

What is claimed is:

1. A honeycomb structure for flowing a fluid therethrough, comprising an extruded and sintered honeycomb structure having a periphery, first and second open ends, a plurality of fluid passages each having a polygonal cross section and defined by partition walls extending in an axial direction of said structure between said first and second ends and a plurality of through holes formed in said partition walls so that said fluid can flow from passages through said through holes to adjacent passages and form turbulent flow; said through holes being arranged in one or more planes which intersect the axis of said honeycomb structure and being substantially separated from each other by partition walls;

wherein said honeycomb structure is formed by joining together in an axial direction and sintering at least two extruded bodies of a powdered material and wherein said plurality of through holes is formed by machining partition walls in an end of at least one of said extruded bodies prior to joining and sintering of the bodies, each of said through holes having an open area of at least 0.25 mm², wherein each through hole has a semi-circular first end, a straight second end, said first and second ends being connected by straight side walls parallel to each other.

2. A honeycomb structure of claim 1, wherein each of said through holes has an open area ranging from 0.28 to 3.14 mm².

TABLE 2

| | | through holes | | | purification rate | | | | | | thermal stress test |
|---|---|---|---|---|---|---|---|---|---|---|---|
| | area ratio | | open area | dis-tance | energized | | | not energized | | | |
| | (%) | shape | (mm²) | (mm) | HC | NOx | CO | HC | NOx | CO | |
| Comp. Ex. 4 | 0 | — | — | — | 39 | 46 | 55 | 46 | 52 | 70 | crack |
| Comp. Ex. 5 | 3 | circle | 0.28 | 9.7 | 37 | 45 | 55 | 45 | 53 | 71 | crack |
| Example 6 | 6 | circle | 0.78 | 12.8 | 50 | 52 | 60 | 55 | 60 | 75 | no crack |
| Example 7 | 11 | circle | 0.45 | 3.2 | 68 | 74 | 80 | 81 | 89 | 94 | no crack |
| Example 8 | 11 | shape 80 | 2.79 5.79 | 9.5 | 65 | 72 | 77 | 78 | 85 | 91 | no crack |

The shape 80 refers to the shape 80 in FIG. 8.

In the present invention, through holes are formed in partition walls defining passages of a honeycomb structure. As a result, when a stream of fluid passes through the passages, the stream becomes a turbulent flow so that the fluid is efficiently mixed together. When a catalyst composition for controlling an exhaust gas is coated onto a surface of the perforated partition walls, the exhaust gas passing through the passages efficiently contacts the catalyst com- 3. A honeycomb structure of claim 1, wherein a sum of said open areas of said through holes ranges from 5% to 35% of a total surface area of said partition walls.

4. A honeycomb structure of claim 1, wherein a sum of said open areas of said through holes ranges from 10% to 25% of the total surface area of said partition walls.

5. A honeycomb structure of claim 1, further comprising a catalyst composition coated onto a surface of said partition walls of said honeycomb structure, said catalyst comprising an inorganic oxide being resistant to heat and a catalytically active component loaded onto to said inorganic oxide, said catalytically active component comprising an element selected from the group consisting of platinum, palladium, rhodium, and iridium.

6. A heating element for heating fluid flowing therethrough, comprising a honeycomb structure which is an extruded and sintered honeycomb structure having a periphery, first and second open ends, a plurality of fluid passages each having a polygonal cross section and defined by partitionally extending in an axial direction of said structure between said first and second ends and a plurality of through holes formed in said partition walls so that said fluid can flow from passages through said through holes to adjacent passages and form turbulent flow, said through holes being arranged in one or more plane which intersect the axis of said honeycomb structure and being substantially separated from each other by partition walls; said honeycomb structure being electrically conductive and formed by joining together in an axial direction and sintering at least two extruded bodies of a powdered material and wherein said plurality of through holes is formed by machining partition walls in an end of at least one of said extruded bodies prior to joining and sintering of the bodies each of said through holes having an open area of at least 0.25 mm$^2$; and means for applying electric current to said honeycomb structure so as to generate heat, wherein each through hole has a semi-circular first end, a straight second end, said first and second ends being connected by straight side walls parallel to each other.

7. A heating element of claim 6, wherein at least one slit is formed through said partition walls.

8. A heating element of claim 6, wherein said means for applying electric current comprises two electrodes in electrical contact with said honeycomb structure.

9. A heating element of claim 6, wherein each of said through holes has an open area ranging from 0.28 to 3.14 mm$^2$.

10. A heating element of claim 6, wherein a sum of said open areas of said through holes ranges from 5% to 35% of a total surface area of said partition walls.

11. A heating element of claim 6, wherein in a sum of said open areas of said through holes ranges from 10% to 25% of the total surface area of said partition walls.

12. A heating element of claim 6, further comprising a catalyst composition coated onto a surface of said partition walls of said honeycomb structure, said catalyst composition comprising an inorganic oxide being resistant to heat and a catalytically active component loaded onto said inorganic oxide, said catalytically active component comprising an element selected from the group consisting of platinum, palladium, rhodium, and iridium.

13. A honeycomb structure for flowing a fluid therethrough, comprising an extruded and sintered honeycomb structure having a periphery, first and second open ends, a plurality of fluid passages each having a polygonal cross section and defined by partition wall extending in an axial direction of said structure between said first and second ends and a plurality of through holes formed in said partition walls, so that said fluid can flow from passages through said through holes to adjacent passages and form turbulent flow; said through holes being arranged in one or more planes which intersect the axis of said honeycomb structure and being substantially separated from each other partition walls;

wherein said honeycomb structure is formed by joining together in an axial direction and sintering at least two extruded bodies of a powdered material and wherein said plurality of through holes is formed by machining partition walls in an end of at least one of said extruded bodies prior to joining and sintering of the bodies, each of said through holes having an open area of at least 0.25 mm$^2$.

wherein each passage is formed by four partition walls, opposing walls being parallel to each other, and at least one through hole is formed in every other partition wall as shown in FIG. 4(a) or 4(b).

14. A heating element for heating fluid flowing therethrough, comprising a honeycomb structure which is an extruded and sintered honeycomb structure having periphery, first and second open ends, a plurality of fluid passages each having a polygonal cross section and defined by partition walls extending in an axial direction of said structure between said first and second ends and a plurality of through holes formed in said partition wall so that said fluid can flow from passages through said through holes to adjacent passages and form turbulent flow, said through holes being arranged in one or more planes which intersect the axis of said honeycomb structure and being substantially separated from each other by partition walls; said honeycomb structure being electrically conductive and formed by joining together in an axial direction and sintering at least two extruded bodies of a powdered material and wherein said plurality of through holes is formed by machining partition walls in an end of at least one of said extruded bodies prior to joining and sintering of the bodies, each of said through holes having an open area of at least 0.25 mm$^2$; and means for applying electric current to said honeycomb structure so as to generate heat, wherein each passage is formed by four partition walls, opposing walls being parallel to each other, and at least one through hole is formed in every other partition wall as shown in FIG. 4(a) or 4(b).

15. A method of making a unitary honeycomb structure having a plurality of fluid passages extending therethrough in an axial direction and defined by partition walls and having through holes formed in said partition walls so that fluid can flow through said through holes between adjacent passages and form a turbulent flow, said method comprising:

a) extruding a powder material to form at least two green honeycomb structures, each structure having said plurality of fluid passages defined by partition walls extending therethrough in an axial direction between first and second open ends;

b) machining partition walls in at least one of said first and second ends of at least one of said green honeycomb structures;

c) joining ends of said green honeycomb structures such that said at least one machined end as formed in (b) is joined to an end of another of said green honeycomb structures; and d) sintering said joined green honeycomb structures to form said unitary honeycomb structure.

16. A method of making a heating element for heating fluid flowing therethrough said heating element comprising a unitary honeycomb structure having a plurality of fluid passages extending therethrough in an axial direction and defined by partition walls and having through holes formed in said partition walls so that fluid can flow through said through holes between adjacent passages and form a turbulent flow, and means connected to said honeycomb structure for generating heat therein, said method comprising:

a) extruding a powder material to form at least two green honeycomb structures, each structure having said plurality of fluid passages defined by partition walls extending therethrough in an axial direction between first and second open ends;

b) machining partition walls in at least one of said first and second ends of at least one of said green honeycomb structures;

c) joining ends of said green honeycomb structures such that said at least one machined end as formed in (b) is joined to an end of another of said green honeycomb structures;

d) sintering said joined green honeycomb structures to form said unitary honeycomb structure; and e) attaching to said unitary honeycomb structure a means for generating heat therein.

17. A method of claim 15 or 16, further comprising the step of applying a catalyst composition to a surface of the partition walls of said unitary structure.

18. A method of claim 15 or 16, wherein at least one partition wall of at least one of said green honeycomb structures is provided with a slit extending in the axial direction of said structure.

* * * * *